3,463,385
END FACE SEALING IN ROTARY PISTON VACUUM PUMP
Hansen Pfaff and Hartmut Sinn, Hanau am Main, and Maximilian Wutz, Grosskrotzenburg, Germany, assignors, by mesne assignments, to Leybold-Heraeus Verwaltung GmbH, Cologne-Bayenthal, Germany
Filed Oct. 6, 1967, Ser. No. 673,337
Claims priority, application Germany, Oct. 26, 1966, H 60,864
Int. Cl. F04c 17/02, 27/00
U.S. Cl. 230—145      6 Claims

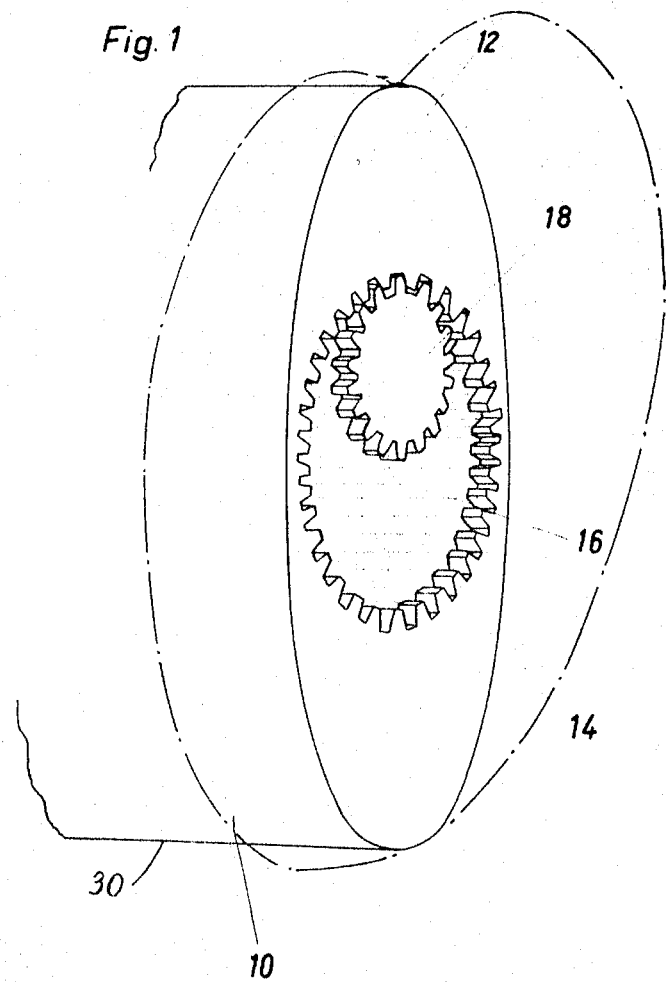

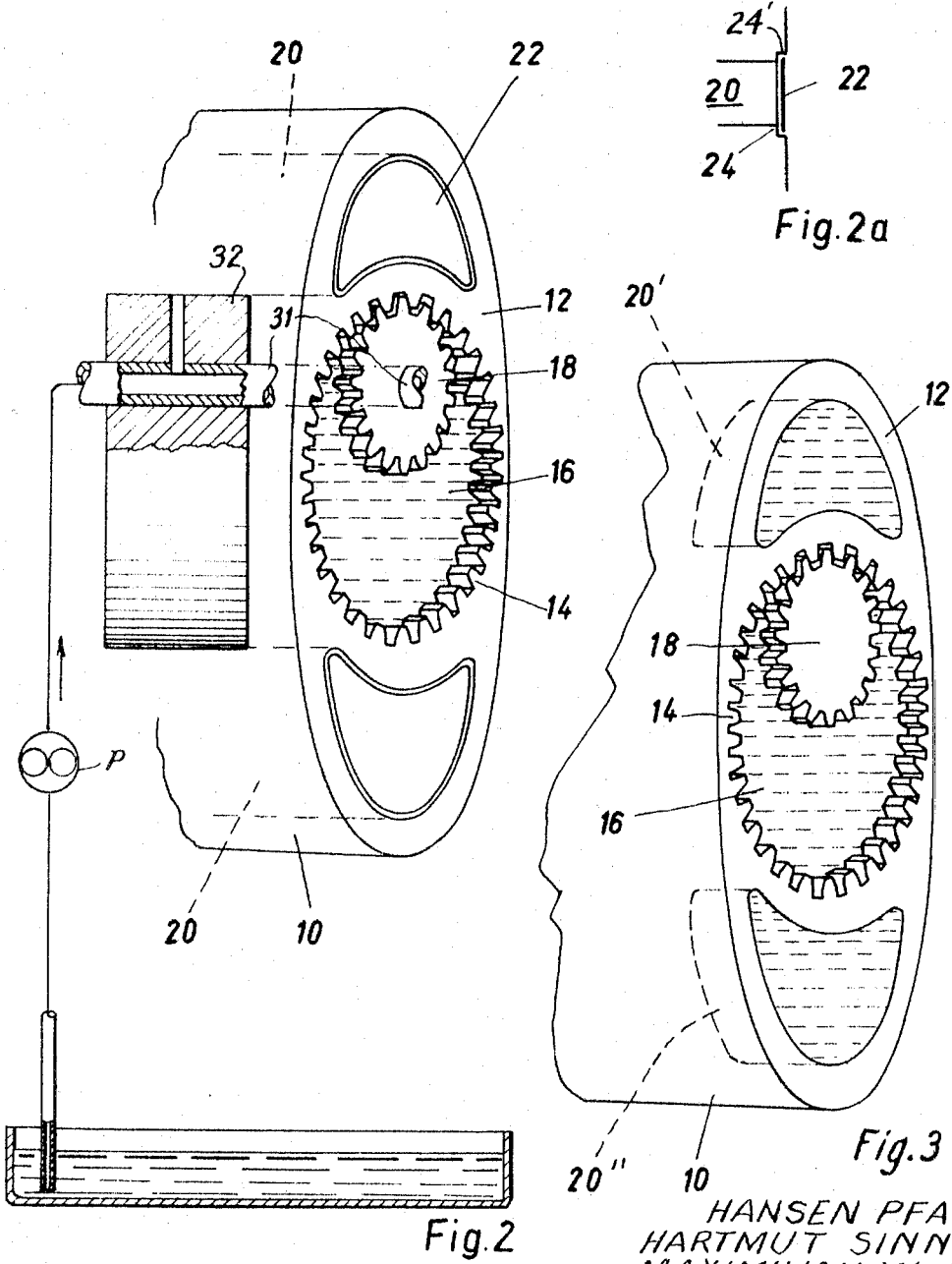

ABSTRACT OF THE DISCLOSURE

An eccentrically operated hollow piston has oil ducts formed therein for the continuous supply of oil to the piston hollows from an oil supply source. The ducts may be supplied with oil through a hollow driving shaft for the piston.

---

The present invention relates to a rotary piston vacuum pump having an eccentrically operating hypotrochoidal form piston rotating within a housing forming a corresponding mantle therefor.

It has been found that, among the various forms of such machines, those having a transmission ratio of 1:2 or 2:3 are particularly useful as vacuum pumps. The exhaust chamber of the pump is separated from the compression chamber by the piston at the circumferential surface of the latter and at the end faces of the piston between the movable and fixed portions of the pump.

Various proposals have been made for sealing of the circumferential surface of the piston relative to the housing. It has now been recognized that the great pressure difference which occurs in vacuum pumps must not be reduced by any possible leakages which might occur at the end surfaces of the piston.

The solution of the problem is made difficult, because the end surfaces of the piston have to carry out, with respect to the corresponding fixed surfaces of the housing, an eccentric rotary sliding motion. In addition, the drive for the piston emanates from the end faces and the guiding of the piston is effected in the region of these surfaces, by a fixed pinion, connected to the housing, the pinion meshing with an internal gearing in the piston itself.

In order to save on weight and in order to simplify the manufacture, the piston is usually hollow. It has been found, with ordinary pistons, that dead spaces at the end faces interfere with high final vacuum. With insufficient sealing at the end faces, gas is taken over the hollow spaces from the compression chamber into the suction chamber.

In order to obtain an optimum sealing effect, in accordance with the present invention, it is proposed to provide the piston with plane end faces and to fill completely with fluid, such as oil, any necessary depressions, for example, for the rolling drive guide. The piston may be solid and the end faces finished. Hollow pistons are preferably closed at their end faces and may have flush, set in, covers. Thus, even in the region of the hollow sealing, a depression occurs and that can be filled completely with oil. All remaining depressions at the end surfaces are preferably always connected to an oil duct so that by constant oil supply, a good sealing at the end surfaces is obtained.

The structure, organization and operation of the invention will now be described more specifically with reference to the accompanying drawings, wherein:

FIG. 1 is a schematic perspective view of the end face of a piston constructed in accordance with the invention;

FIG. 2 is a view similar to that shown in FIG. 1 of a second embodiment;

FIG. 2a is a schematic sectional detail of part of the embodiment shown in FIG. 2; and FIG. 3 is a further schematic view of the end face of the piston.

In the drawings, like reference numerals denote like parts.

A piston 10, shown in all the embodiments, is of elliptical form and operates in a housing 30; more specifically the piston is of hypotrochoidal form which is most suitable for a machine having a rotational transmission ratio of 1:2. An end surface 12, as seen, for example, in FIG. 1, is a smoothly worked surface of a solid piston 10. The end surface 12 is concentric with an internal gearing 14, which delimits an internal space 16 of the piston 10. The internal gearing 14 runs on a fixed pinion 18 which is connected by means not shown into the housing 30. The hollow space 16 is completely filled with oil and is connected at all times by oil ducts in the interior of the piston 10, with an oil supply.

A piston 10 is shown in FIG. 2 which is hollow and has cavities 20 in order to save weight and for ease of manufacture. The openings to the cavities 20 are closed off by means of covers 22 set into the end face 12. Each cover 22, as shown in FIG. 2a, is flush with the end surface 12 and with respect to the housing 30. Each cover 22 fits against a corresponding shoulder 24 to eliminate any small differences possibly occurring between the surfaces of the cover 22 and the end face 12. The shoulder 24 is recessed so far that a depression 24′ occurs within the region of the cavity 20, which, like the central space 16, is filled with oil; the depressions 24′ are also filled with oil.

As shown in FIG. 2, a driving shaft 31, having mounted thereon an eccentric 32, passes freely through the center of the pinion 18. To conduct oil to the required points, the shaft 31 can be made hollow and have branches leading through the eccentric 32. Oil is circulated by a pump P through a line and into the hollow shaft (shown schematically only in the drawing) and from there to the lubricating and sealing surfaces.

In the embodiment shown in FIG. 3 no cover plates are provided. To reduce weight the cylinder is hollowed out at the two places 20′ to a depth 20″ only. As in the case of the central hollow space 16, these two hollow spaces are kept filled with oil from the central oil ducting system.

In all cases the open hollow spaces are closed off in the piston with respect to the housing in such a manner that no gas can be carried over from the pressure side to the suction side of the pump. At those places where sealing oil is necessary or desirable, it can be brought from the interior of the piston directly to those points at which it is needed.

Further features of a pump in accordance with the present invention are shown and described in detail in the co-pending applications by the inventor herein filed at the same date Oct. 6, 1967, and entitled: Oil Sealing of Rotary Piston Vacuum Pump, S.N. 673,359; Transmission Drive for Rotary Piston Vacuum Pump, S.N. 673,427; and Oil Circulation in Rotary Piston Vacuum Pump, S.N. 673,336.

We claim:

1. In an oil sealed, rotary-piston vacuum pump having a housing, an eccentrically rotatable hypotrochoidal piston formed with open recesses, movably located in said housing, said housing having the form of the enveloping figure for said piston, and gears controlling the motion of the piston in said housing and located in said recesses;

the improvement wherein the end faces of the piston are continuous plane surfaces having said open recesses formed therein and an oil completely filling said recesses.

2. Pump according to claim 1 wherein said piston is solid and has plane, flat surfaces.

3. Pump according to claim 1 wherein the piston is formed with cavities to reduce its weight, and cover plates are provided closing said cavities at the end faces, said cover plates having outer faces flush with the end faces of the piston.

4. Pump according to claim 3 wherein said recesses located within the region of the cover plates are completely filled with oil.

5. Pump according to claim 1, including an oil supply, said oil-filled recesses being permanently connected to the oil supply.

6. Pump according to claim 1, the transmission ratio of said gears being in the range of 1:2 to 2:3.

References Cited

UNITED STATES PATENTS

| | | | |
|---|---|---|---|
| 3,042,009 | 7/1962 | Froede et al. | 123—8 |
| 3,091,386 | 5/1963 | Paschke | 230—145 |
| 3,102,683 | 9/1963 | Paschke et al. | 123—8 |

WILLIAM L. FREEH, Primary Examiner

W. J. GOODLIN, Assistant Examiner